United States Patent [19]

Thomas

[11] Patent Number: 5,070,718

[45] Date of Patent: Dec. 10, 1991

[54] METHOD AND APPARATUS FOR THE PRODUCTION OF METAL PRODUCTS

[75] Inventor: John D. Thomas, Swansea, Wales

[73] Assignee: IMI Titanium Limited, England

[21] Appl. No.: 217,032

[22] Filed: Jul. 11, 1988

Related U.S. Application Data

[63] Continuation of Ser. No. 943,885, Dec. 19, 1986, abandoned, which is a continuation of Ser. No. 864,575, May 19, 1986, abandoned, which is a continuation of Ser. No. 717,141, Mar. 28, 1985, abandoned.

[30] Foreign Application Priority Data

Apr. 4, 1984 [GB] United Kingdom ............... 8408618

[51] Int. Cl.$^5$ ............................................. B21H 7/16
[52] U.S. Cl. .......................................................... 72/198
[58] Field of Search ................ 72/188, 191, 197, 198, 72/366

[56] References Cited

U.S. PATENT DOCUMENTS

| | | | |
|---|---|---|---|
| 156,928 | 11/1874 | Johnson | 72/198 |
| 755,433 | 3/1904 | Baker | 72/198 |
| 1,123,460 | 1/1915 | Adams | 72/198 |
| 1,568,050 | 1/1926 | Budd | 72/198 |
| 1,772,538 | 8/1930 | Donner | 72/198 |
| 2,736,948 | 3/1956 | Barnes | 72/198 |
| 2,972,181 | 2/1961 | Hollis et al. | 29/156.8 B |
| 3,834,207 | 9/1974 | Laigle et al. | 72/241 |
| 4,050,273 | 9/1977 | Tada | 72/200 |

*Primary Examiner*—Lowell A. Larson
*Attorney, Agent, or Firm*—Cushman, Darby & Cushman

[57] ABSTRACT

A method of producing a profiled plate in a metal alloy by rolling the plate through a four high mill, the work rolls having pockets to accommodate the thicker portion of the plate, the work rolls rolling the plate and discharging it on the side opposite the side into which it was fed.

4 Claims, 4 Drawing Sheets

METHOD AND APPARATUS FOR THE PRODUCTION OF METAL PRODUCTS

This is a continuation of application Ser. No. 943,885, filed Dec. 19, 1986, which was abandoned upon the filing hereof, which is a continuation of application Ser. No. 864,575 filed May 19, 1986 now abandoned, which is a continuation of application Ser. No. 717,141, filed Mar. 28, 1985 which was abandoned upon the filing thereof.

BACKGROUND OF THE INVENTION

This invention relates to the production of metal flat products having more than one thickness or which vary in thickness in a controlled manner. It has particular but not necessarily exclusive reference to the manufacture of such plates in titanium, aluminium, nickel, iron or alloys based on such metals.

Titanium alloys are expensive to produce and this is particularly so in the case of titanium alloys used in aero-engine components. Because of the need for extremely high levels of integrity in such parts the quality control required to produce the metal is so high that it adds significantly to the expense. As the parts are frequently of a complex shape it is often necessary to carry out extensive machining of the starting material and these machining operations produce large quantities of waste scrap which has little value.

There is, therefore, a tendency to produce starting components to as near the final nett shape of the products to be produced as is possible. In the manufacture of blades or propellers for use in engines the blades essentially comprise a relatively thin sheet of metal having a thickened end portion which is machined or forged to form a root which is attached to a suitable disc. It would obviously be possible to produce the root by starting with a thick plate and machining away all of the excess material to manufacture the thin sheet leaving the thickened end portion to form the root, the thickened end portion having the thickness of the original plate. Such a machining operation would, however, be very expensive and the yield would be very low.

There has, therefore, been a long felt want for a method to produce a plate of titanium having a thickened end portion and a thinner or tapered body portion. Typically the plate would be 500 mm wide, the thickened portion would be 100 mm long and the main body of the thin portion of the plate would be 1½ m long.

SUMMARY OF THE INVENTION

By the present invention there is provided apparatus for rolling metal plate, slab or sheet to produce metal having more than one thickness in the rolling direction which comprises a rolling mill having a pair of work rolls and at least one pair of backing rolls, one at least of the work rolls having a pocket extending partly around its circumference to accommodate the thicker portion of the plate, slab or sheet to be rolled.

Preferably the work rolls are adapted to rotate in use in one direction only, the arrangement being such that metal to be rolled is fed into the work rolls from one side and feeds through the rolls to be rolled and to be discharged from the nip of the rolls on the opposite side to the side into which it was fed.

There may be provided an end stop against which the leading end of the metal is located prior to rotation of the work rolls for rolling, part at least of the metal being accommodated within the recess. The end stop may be movable between a first position, in which it provides a positive stop for the metal, and a second position, in which it permits the metal being rolled to pass out of the nip of the work rolls, the end stop being resiliently biassed so that when in the first position it can be pushed to the second position by the action of the work rolls pushing the metal against the stop but normal loading forces are insufficient to push the end stop from the first position to the second position The said first position of the end stop may be variable.

Where it is desired to produce a non-symmetrical form one of the work rolls may have a recess and/or form and be employed in conjunction with a plain matching work roll.

Alternatively two plates may be secured together, pre-heated and rolled as a composite so as to yield two matching non-symmetrical plates. A stop weld compound may be employed to prevent roll bonding of the plates.

The recess may extend around the entire circumference of the work roll having additional depth over a portion of the circumference so that the backing roll does not contact the work roll over any of the region in which rolling occurs. The circumference of the work rolls may be greater than the total length of the metal to be rolled. Alternatively the circumference of the work rolls may be less than the length of the metal to be rolled and the metal may be located between the rolls prior to rolling with the transitional region between the thick and thin portion of metal in the main portion of the recess. The recess may have a portion of greater depth interconnected to a portion of less depth by a shaped transitional region. The work rolls may be rotated one revolution per cycle and may be preheated prior to hot rolling the metal. Both work rolls may have recesses to permit rolling of a metal plate, slab or sheet to a substantially T-shaped longitudinal cross-section.

The present invention also provides a method of rolling metal comprising the steps of inserting a sheet, plate or slab of metal into a pair of work rolls, the work rolls having at least one pair of backing rolls and one at least of the work rolls having a pocket extending partly around its circumference to accommodate a thicker portion of the plate, slab or sheet to be rolled, rotating the work rolls by one revolution or less to pass the metal through the work rolls to reduce a portion of the metal in thickness, the work rolls being rotated so that the metal is inserted from one side and passes through the other side for discharge from the nip of the rolls. The method is particularly applicable to rolling titanium or titanium alloys such as the alloy titanium 6 wt% aluminium 4 wt% vanadium.

The method and apparatus of the invention enables a single pair of work rolls having one or a pair of recesses to be used to reduce in thickness a slab over a series of passes. Preferably the method is used to hot roll the titanium alloy, the alloy being heated to a temperature high in the alpha beta field and rolled whilst still hot. The method enables a plate of titanium to be rolled so as to have a thickened end portion and a long thin or tapered main body portion which has a surface sufficiently smooth and free of surface cracks, pits and other defects to enable it to be fabricated, machined or chemically milled during subsequent processing.

It will be appreciated that such a rolling method is unusual in that rolling is carried out with only a single revolution of the work rolls. Clearly if the circumference of the work roll was less than the length of the metal rolled the recess in the work roll would come round to form a hump in the plate. Furthermore, as the plate extends in length the length of the hump would extend along the rolling axis of the plate.

The present invention also provides metal when rolled by the method set out above or utilising the apparatus of the present invention. As will be explained below the unthinned portion of the plate, slab or sheet can be of any length as it is not rolled during the production method.

It will be noted that it is not possible to produce such a profiled plate of adequate quality by rolling along the line of the step as the rolling process would not permit metal to deform in the correct direction without unwanted distortion of the plate. Furthermore, attempts to consistently roll plate of adequate quality by rolling the thinner portion and stopping the rolls at the transitional region between the thin and thick portions have proved impracticable. To hot roll such a design up to a step would involve rolling the metal slowly but in so doing heat loss to the rolls would be so great that surface cracking of the titanium alloy might occur. Furthermore it is difficult to stop rolling mills instantaneously.

It will also be appreciated that in the preferred arrangement the metal passes through the rolls in a single direction, by comparison to roll forging in which metal is located in the roll dies in the open position and is returned to the entry side during the roll forging process. It will also be appreciated that roll forging has not been used commercially hitherto for the manufacture of plate, slab or sheet products having been used for the production of bar-like products.

It will be further appreciated that the problems of rolling titanium are different to the problems of rolling conventional steels in that the rolling pressures required to roll titanium vary very significantly with the processing temperature. The pressures required to deform the titanium increase dramatically for small temperature decreases of the product being rolled.

BRIEF DESCRIPTION OF THE DRAWINGS

By way of example embodiments of the present invention will now be described with reference to the accompanying drawings, of which.

DESCRIPTION OF THE PREFERRED EMBODIMENTS

Figure 4:
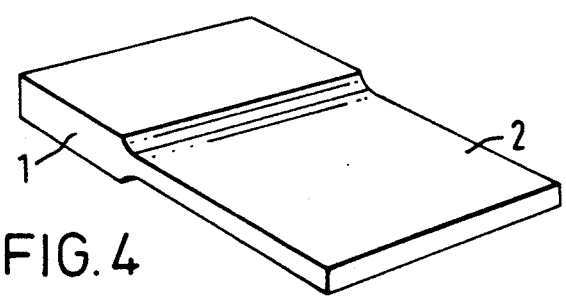
FIG. 4 is an isometric view of a rolled plate.

The product to be manufactured by rolling is illustrated in FIG. 4. Essentially it comprises a sheet of titanium alloy having a thickened end portion 1 and an integral thinner body portion 2. Typically the end portion 1 would have a thickness of 30 mm whereas the thickness of the body portion 2 would be 7 mm. The whole rolled member would be 500 mm wide and the total length of the portions 1 and 2 would be 1,000 mm.

The product illustrated in FIG. 4 is manufactured from a plate having a starting thickness of the thickness of portion 1, a width of 500 mm and a length of approximately 400 mm. The product is manufactured by rolling in the mill illustrated in FIGS. 1 to 3. The rolling mill comprises a pair of work rolls 3, 4 supported on journals 5, 6. The journals are mounted in frames 7, 8 in a conventional manner. Backing rolls 9, 10 support the work rolls 3, 4 respectively. The backing rolls are mounted by means of journals 11, 12 in the frame 7, 8 as is conventional.

Figure 1:
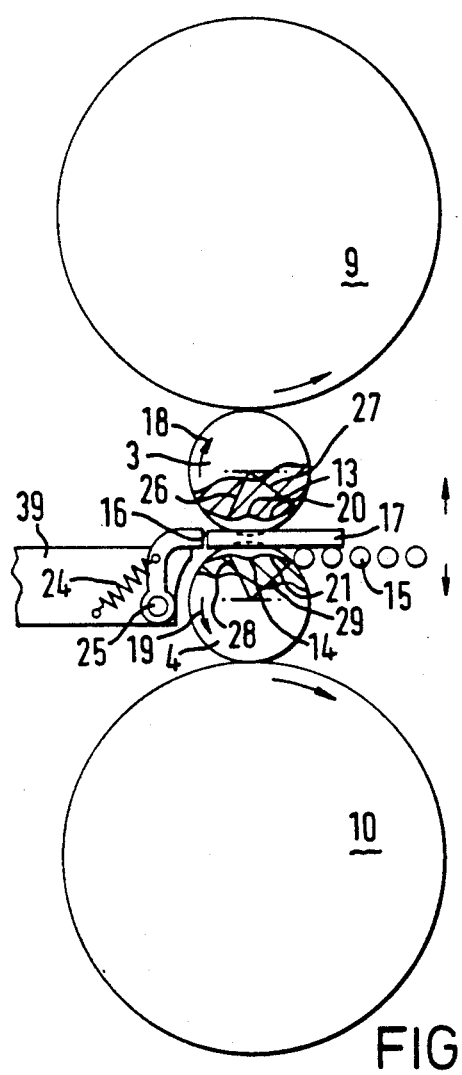
FIG. 1 is a side elevational view partially in section of a four high rolling mill.

Each of the work rolls 3, 4 is provided with a pocket 13, 14 extending partly around its circumference and the pockets 13 and 14 are matched so that during rotation of the work rolls 3, 4 they oppose one another as is illustrated in FIG. 1. To roll a metal plate the plate is passed along a roller table 15 into the nip of the work rolls 3, 4. The end of the plate is positioned against a stop 16 as shown in FIG. 1. It can be seen that in the arrangement illustrated in FIG. 1 the plate 17 is free to move between the roll gap to contact the stop 16. When the work rolls 3, 4 are rotated in the direction of the arrows 18, 19 the cam surfaces 20, 21 come into contact with the plate 17 and roll the plate to reduce it in thickness. After the plate has been rolled once it can be rolled again through the same work rolls which can be moved towards one another by suitable adjusting means, not shown, so that the thickness of the portion 2 of the plate can be continually reduced in a series of passes.

The depth of the recesses 13, 14 is so arranged that even when the portion 2 is reduced to its smallest extent the end portion 1 is not reduced in thickness at all.

Figure 2:
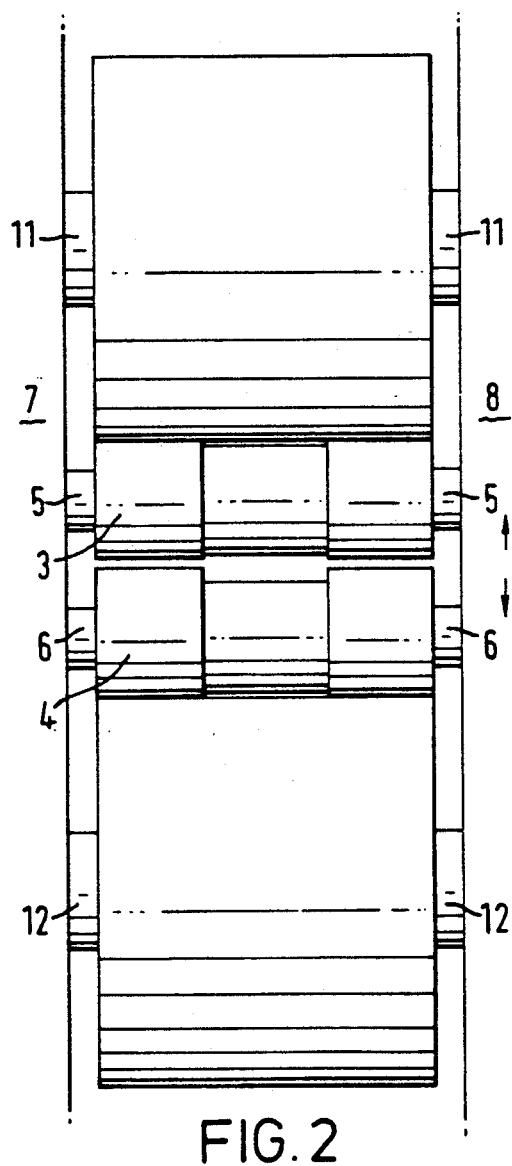
FIG. 2 is a view of the rolls of the mill of FIG. 1.
Figure 3:
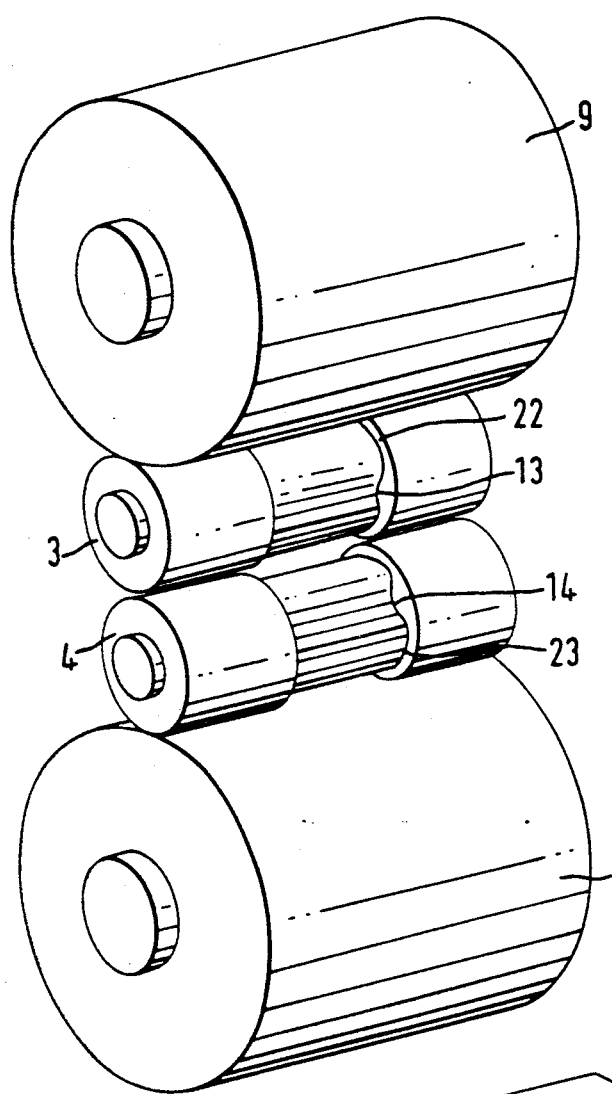
FIG. 3 is a perspective view of the rolls of FIG. 2.

As can be seen most clearly in FIG. 3 the pockets 13 and 14 are formed in complete circumferential recesses 22, 23. The reason for the complete circumferential recess will be explained below. The circumferential recess is also illustrated in FIG. 2.

Many titanium alloys have to be rolled hot and the arrangement illustrated in FIG. 1 enables rapid rolling of the material to occur. The heated titanium plate is fed in over the roller table 15 into contact with the stop 16. The stop is supported by a spring 24 which will withstand normal loads imposed upon the stop during loading of the plate 17 into the roll gap. However, when the work rolls are rotated the force exerted on the stop 16 by the action of the rolls is such that the spring 24 gives way, and the end stop pivots on pivot 25 to permit the plate 17 to pass through the work rolls during a rolling cycle.

The manufacturing method illustrated in FIGS. 1 to 3 produces a stepped plate product which is illustrated in FIG. 4. The thickness of the portion 2 can be controlled to very narrow tolerances Equally importantly, the surface of the portion 2 is very uniform and free of defects, such as surface cracks and pits, which means that the surface can be readily fabricated to final dimensions by chemical milling. In the absence of such a clean surface, prior machining or surface conditioning of the portion 2 would be necessary to make it acceptable for chemical milling.

Figure 6A:
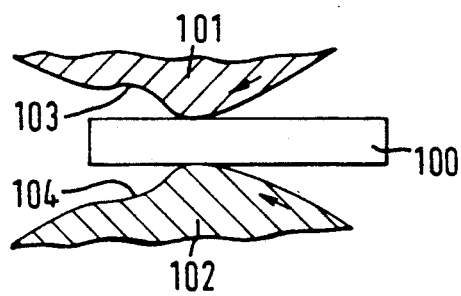
FIGS. 6A to 6D are end elevational views showing stages in the rolling.
Figure 6B:
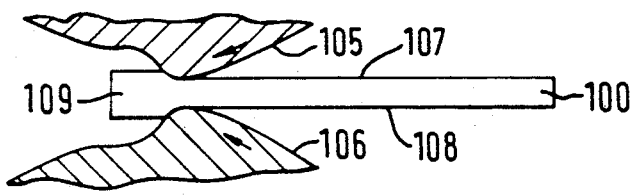
Figure 6C:
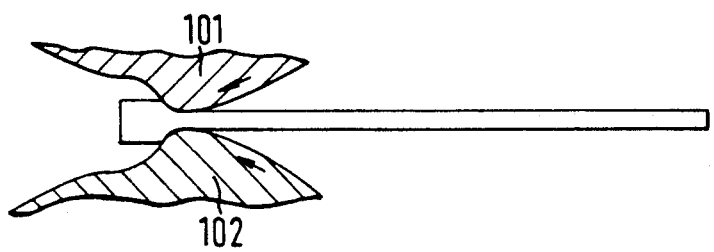
Figure 6D:
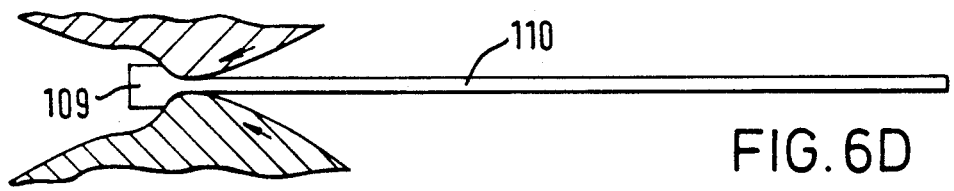

As is shown clearly in FIGS. 6A to 6D the process for transforming a plate of a single thickness into a stepped plate takes place progressively over a series of passes. FIG. 6A shows the plate 100 located between the work rolls 101, 102. The work rolls are just starting to nip the plate, having started the rolling process. During the first pass the plate will be reduced in thickness over the portion beyond the pockets 103, 104 to attain the shape illustrated in FIG. 6B. The work rolls are then slightly moved towards each other and the workpiece is inserted for a further revolution of the rolls. It can be seen that the rolling surfaces 105, 106 operate only on the surfaces 107, 108 of the workpiece 100, leaving the end portion 109 unrolled Again the work rolls have started rotating in the direction of the arrows and are starting to compress and roll the workpiece. After the second passage of the work rolls over the workpiece the material will be thinned to the thickness shown in FIG. 6C. The final rolling operation is then given as shown in FIG. 6D to end up with a member having a thickened end portion 109 and a thin sheet-like portion 110.

All of FIGS. 6A to 6D show the work rolls after they have started to revolve.

Figure 7:
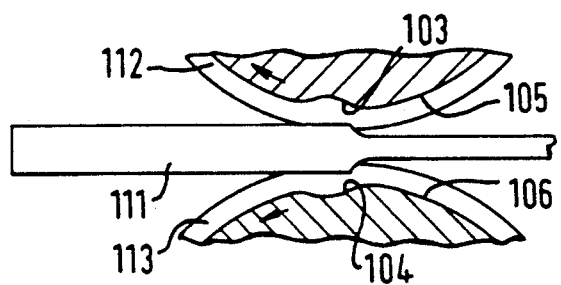
FIG. 7 is an enlarged view of a further rolling process.

FIG. 7 shows the work rolls in their separated position when the workpiece is inserted. It can be seen that the end portion 111 of the workpiece can project through the work rolls to any desired extent. The portions 105, 106 of the work rolls are so arranged as to be a distance apart greater than the thickness of the end portion 111. The end portion 111 then projects through the gap formed by the pockets 103, 104. FIG. 7 shows the shoulders 112, 113 of the radial recesses in which the pockets 103, 104 are located The reason for the recess is given in detail below.

Figure 5A:
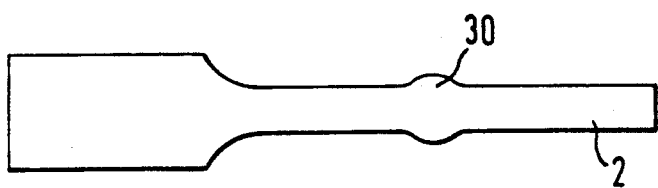
FIGS. 5A to 5D are end elevational views of products in rolled form.

It has been found that when utilising the back-up rolls 9, 10 to support the work rolls 3, 4 wide plates can be rolled with steps as illustrated in FIG. 4. However, the use of a complete circumferential recess for the work rolls is desirable, as in the absence of such a recess, with a pocket formed over only a small proportion of the work rolls' circumference, the defect illustrated in FIG. 5A can be found. This defect, essentially comprising a hump or thickened portion 30 formed in the portion 2 (shown exaggerated in FIG. 5A), results from rotation of the roll to a position such that the pockets 13, 14 reach the backing rolls 9, 10 so that the backing rolls locally no longer support the work rolls. In such a case the work rolls flex slightly to give the hump 30. Clearly, as the plate is rolled during a number of passes the hump 30 increases in thickness relative to the reducing thickness of the plate so that a non-uniform product is eventually formed. For this reason, for the tightest tolerances it is preferred that the pockets 13, 14 or 103, 104 be provided within complete circumferential recesses.

Figure 5B:
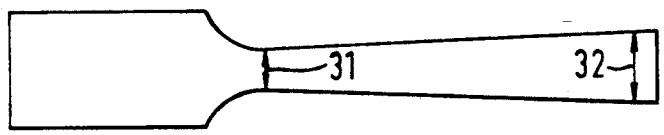

It is also preferred that the work rolls 3, 4 be heated during the rolling operation and prior to the rolling operation. The reason for this is that by preheating the work rolls they can attain a substantially uniform elevated temperature of approximately 100 to 200° C. Such a preheating obviates the formation of plate in the form illustrated in FIG. 5B. From FIG. 5B it can be seen that the thickness 31 of the portion 2 is less than the thickness 32 of the portion 2. It has been found that if cold work rolls are used the portion of the circumference of the work rolls remote from the recess is only contacted with hot metal as the rolling process proceeds and the portion 2 increases in length.

Effectively, therefore, the portion of the rolls in the region 20, 21 always sees hot metal whereas the portion remote from the regions 20, 21 along the circumference see hot metal only after a series of passes have been completed. Thus the work rolls suffer from differential thermal radial expansion and the thickness of the portion 2 correspondingly varies along the length of the portion 2.

Figure 5C:
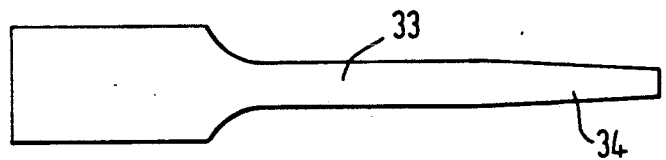

If desired the form of product illustrated in FIG. 5C could be manufactured. It can be seen from this that the product has a substantially constant thickness over the region 33 but is tapered over the region 34. This tapered portion can be manufactured by suitable machining of the circumferential recess or pocket 22, 23.

Figure 5D:
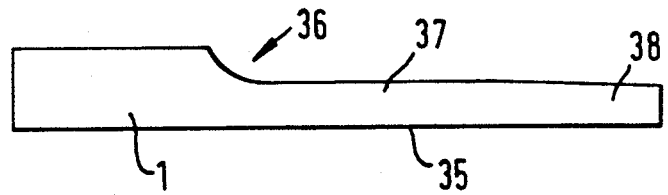

Although the apparatus as described heretofor has been utilised for the manufacture of substantially T-shaped longitudinal cross-sectional plates, L-shaped plates may be manufactured as illustrated in FIG. 5D. In this the end portion 1 has a substantially flat underside 35 and has a thinned upper face 36 which has a portion of constant thickness 37 and a tapered portion 38. If required the thickness of the reduced portion may be varied in thickness in a controlled manner over its entire length, for example to produce a tapered portion 2.

Clearly to manufacture a product illustrated in FIG. 5D only one of the work rolls 3 would be provided with the pocket and recess.

It will also be appreciated that the length of the portion 1 of the stepped plate can be any length as required. As the product to be rolled is passed through the roll gap without touching the rolls prior to rolling the portion 1 could be several meters long and simply be supported by a table, such as table 39, with rolling only occurring over a restricted length portion to produce a thin portion 2 of the stepped plate Such a unit may be useful in the manufacture of spars for aircraft wing production.

Apart from rolling asymmetric products by using only one recessed roll it is possible to manufacture asymmetric products two at a time. To do this a pair of titanium or other metal plates would be separated by a stop weld, heated and rolled in an apparatus of the type illustrated in, for example, FIG. 1. This would produce a pair of plates back to back, the upper plate having a cross-section as shown in FIG. 5D, the lower plate being a mirror image. After rolling the plates would simply be separated for subsequent processing.

The invention is particularly applicable to the manufacture of titanium stepped thickness plates. Titanium and titanium alloys, such as the alloy titanium plus 6 wt% aluminium 4 wt% vanadium, are extremely temperature-sensitive in regard to the pressure required for deformation versus temperature. As the temperature of the product falls the resistance to deformation of the metal increases rapidly. The apparatus and technique of the present invention enables titanium product to be rolled rapidly and this rapid rolling enables a profiled product to be manufactured which has a high surface integrity, being substantially free of cracking, pits and other surface defects It will be appreciated, however, that other metals apart from titanium and titanium alloys could be processed by the route illustrated and described.

I claim:

1. Apparatus for rolling metal plate, slab or sheet to produce metal having more than one thickness in the rolling direction which comprises a rolling mill having a pair of work rolls and at least one pair of backing rolls, one at least of the work rolls having a recessed portion extending around at least part of the circumference of the roll and extending over an intermediate axial length of the roll, and a single pocket within said recessed portion of the same axial length as said recessed portion extending partly around the circumferential surface of said recessed portion for accommodating the thickness portion of the plate, slab or sheet to be rolled, the recessed portion extending around the entire circumference of the work roll such that the backing roll in contact with said work roll does not contact the work roll over any of the surface of the recessed portion, the work rolls being adapted to rotate in use in one direction only, the arrangement being such that metal to be rolled is fed into the work rolls from one side and feeds through the rolls to be rolled and to be discharged from the nip of the rolls on the opposite side to the side into which it was fed and an end stop located on the discharge side of the roll gap against which the leading edge of metal to be rolled may be located.

2. Apparatus as claimed in claim 1 which said end stop is movable and is resiliently biased between a first position in which it provides a positive stop for the metal, and a second position in which it permits metal being rolled to pass out from between the work rolls.

3. A method of rolling metal comprising the steps of inserting a sheet, plate or slab of metal into a pair of work rolls, the work rolls having at least one pair of backing rolls and one at least of the work rolls having a recessed portion extending around at least part of the circumference of the roll and extending over an intermediate axial length of the roll and a single pocket within said recessed portion of the same axial length as said recessed portion extending partly around the circumferential surface of said recessed portion for accommodating the thickness portion of the plate, slab or sheet to be rolled, rotating the work rolls by one revolution or less to pass the metal through the work rolls to reduce a portion of the metal in thickness, the work rolls being rotated so that the metal is inserted from one side and passes through the other side for discharge from the nip of the rolls, said method including the further steps of heating the work rolls prior to rolling and rolling a metal plate of constant thickness into a stepped plate by repeatedly passing the plate through the work rolls at different settings from the same side.

4. A method as claimed in claim 3 in which a pair of asymmetric products are produced by introducing a pair of joined plates to work rolls which have matching opposed pockets, the worked plates being subsequently separated.

* * * * *